No. 740,044. Patented September 29, 1903.

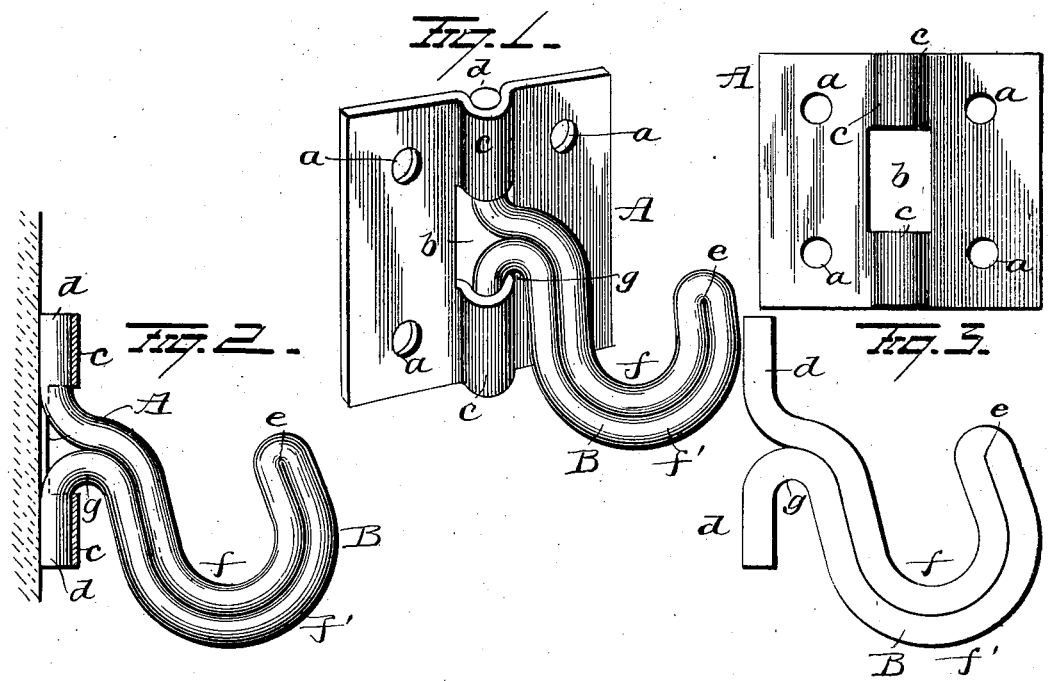

UNITED STATES PATENT OFFICE.

THOMAS C. RICHARDS, OF WINSTED, CONNECTICUT.

HOOK.

SPECIFICATION forming part of Letters Patent No. 740,044, dated September 29, 1903.

Application filed May 17, 1901. Serial No. 60,742. (No model.)

*To all whom it may concern:*

Be it known that I, THOMAS C. RICHARDS, of Winsted, in the county of Litchfield and State of Connecticut, have invented certain new and useful Improvements in Hooks; and I do hereby declare the following to be a full, clear, and exact description of the invention, such as will enable others skilled in the art to which it appertains to make and use the same.

My invention relates to an improvement in hooks; and it consists in the parts and combination of parts, as will be more fully described, and pointed out in the claim.

In the accompanying drawings, Figure 1 is a view in perspective of my improvement. Fig. 2 is a view in section of same. Fig. 3 is a view of the parts detached.

A represents the hook-supporting plate provided with a series of bolt or screw holes $a$ therein and centrally with an elongated opening $b$. This plate is bent or stamped up centrally to form two bearings $c$, each of which is in the form of an arc of a circle, said bearings being located in line with each other and in line with the long axis of the elongated opening $b$ to support the bearing-pintles $d$ of the hook B. This hook B is preferably made of round wire bent centrally upon itself, as at $e$, and then bent into U or hook shape, with the two members $f$ and $f'$ thereof resting in the same vertical plane, or, if desired, the members $f$ and $f'$ thereof could, as will be readily seen, rest side by side in the same horizontal plane. The free end of the lower member $f'$ is then bent abruptly downwardly, as at $g$, to form the lower pintle $d$, while the free end of the upper member $f$ is curved outwardly and upwardly, its extreme end being straight to form the upper pintle $d$. These pintles rest within their respective bearings $c$ in the bearing-plate A, the two bearings being open at the back, but of sufficient depth to receive the pintles, thus allowing the supporting-plate to rest solidly throughout its entire surface against the support to which it may be attached.

By making the hook of round wire the end $e$ thereof is blunt with curved surfaces, and hence cannot cut or penetrate anything brought into contact therewith, and by mounting the hook as explained it is free to swing or move on its pivots. Again, with this construction the hook can be readily detached from the plate by simply withdrawing the hook through the opening in the plate, and the parts can be instantly assembled by passing the hook through the opening in the plate from the rear.

This hook from the peculiarities in its construction is not only exceptionally strong, but is devoid of any sharp edges or angles which would tend to cut or wear through a rope hung therefrom, and as it is free to swing or give with the movements of the rope it forms an admirable suspending device for hammocks, swings, &c.

It is evident that many slight changes might be resorted to in the relative arrangement of parts herein shown and described without departing from the spirit and scope of my invention. Hence I would have it understood that I do not wish to confine myself to the exact construction of parts herein shown and described; but, Having fully described my invention, what I claim as new, and desire to secure by Letters Patent, is—

As a new article of manufacture, a suspending device comprising a wire bent upon itself, the two members of the wire being bent to form a hook having its two members parallel with each other from end to end of the hook, the free end of one member bent upwardly and the free end of the other member bent downwardly to form alined pintles, and a plate having bearings in which said pintles are pivotally mounted, said plate having holes at respective sides of said bearings for the passage of fastening devices.

In testimony whereof I have signed this specification in the presence of two subscribing witnesses.

THOMAS C. RICHARDS.

Witnesses:
JAMES W. THOMPSON,
GEO. W. LAMB.